Figure 1:
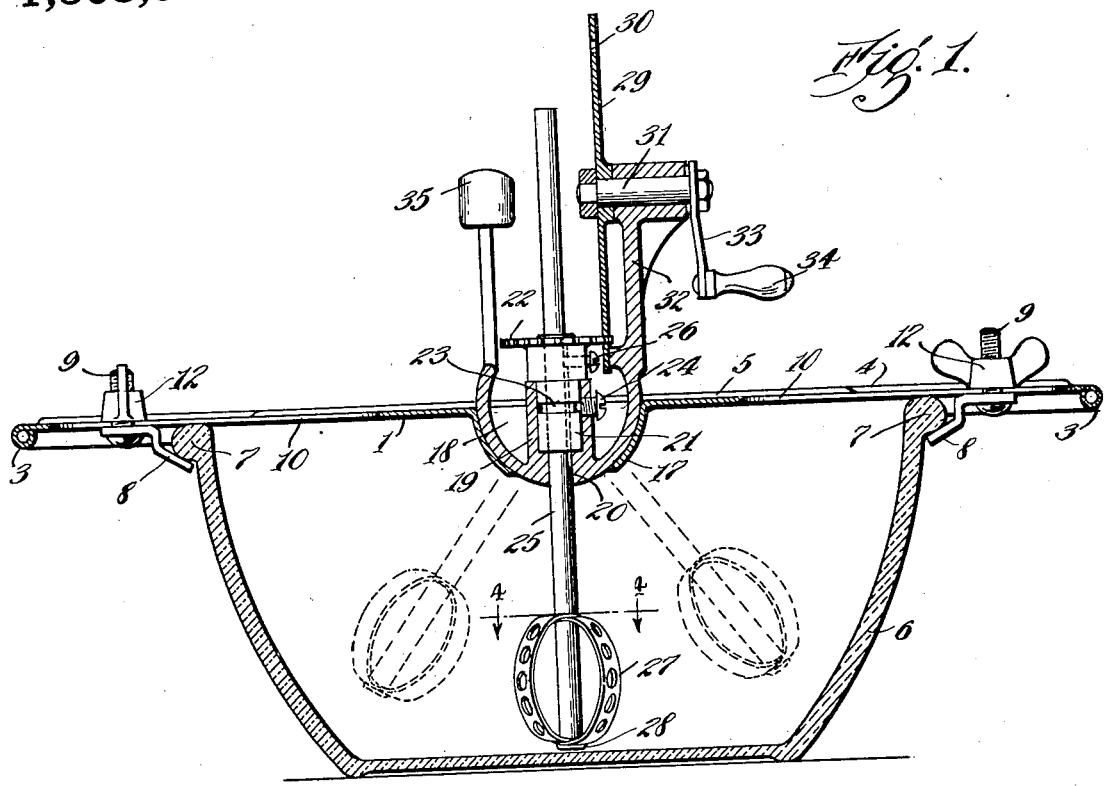

E. JOHNSON.
WHIPPER FOR EGGS, CREAM, OR THE LIKE.
APPLICATION FILED MAY 5, 1919.

1,308,953.

Patented July 8, 1919.
2 SHEETS—SHEET 1.

Inventor,
Erich Johnson
By John A. Bromhurst
Atty.

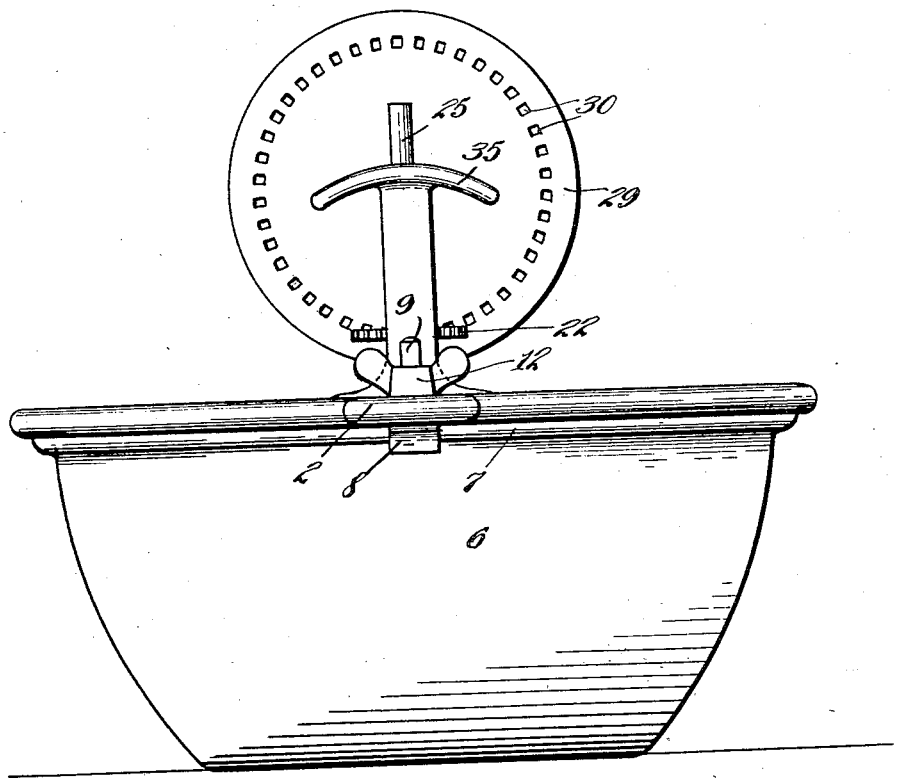
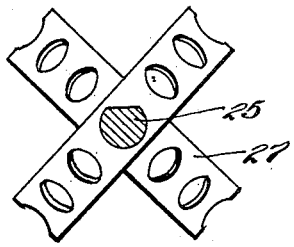

UNITED STATES PATENT OFFICE.

ERICH JOHNSON, OF CLEVELAND, OHIO.

WHIPPER FOR EGGS, CREAM, OR THE LIKE.

1,308,953.

Specification of Letters Patent.  Patented July 8, 1919.

Application filed May 5, 1919. Serial No. 294,742.

*To all whom it may concern:*

Be it known that I, ERICH JOHNSON, a citizen of the United States, residing at Cleveland, in the county of Cuyahoga and State of Ohio, have invented certain new and useful Improvements in Whippers for Eggs, Cream, or the like, of which the following is a specification.

This invention relates to mixers or beaters for eggs, cream or the like and has for its objects the provision of a device which will adapt itself to any size or shape container, with means for adjusting the operating shaft to accommodate various depths of containers, at the same time allowing the shaft with its attached whippers to be placed at any angle within the container by the whippers attached thereto with a rapid rotary motion, and means for controlling the placing of the whippers at any point within the confines of the container.

Further and more limited objects are in the provision of a device which will be simple and efficient in operation, cheap of manufacture and easily removed and disassembled for purposes of storage.

The foregoing may be accomplished in the embodiment of the invention shown in the drawings forming part of the specification and in which like reference numerals designate like parts throughout the various views.

In the drawings:—

Figure 2:
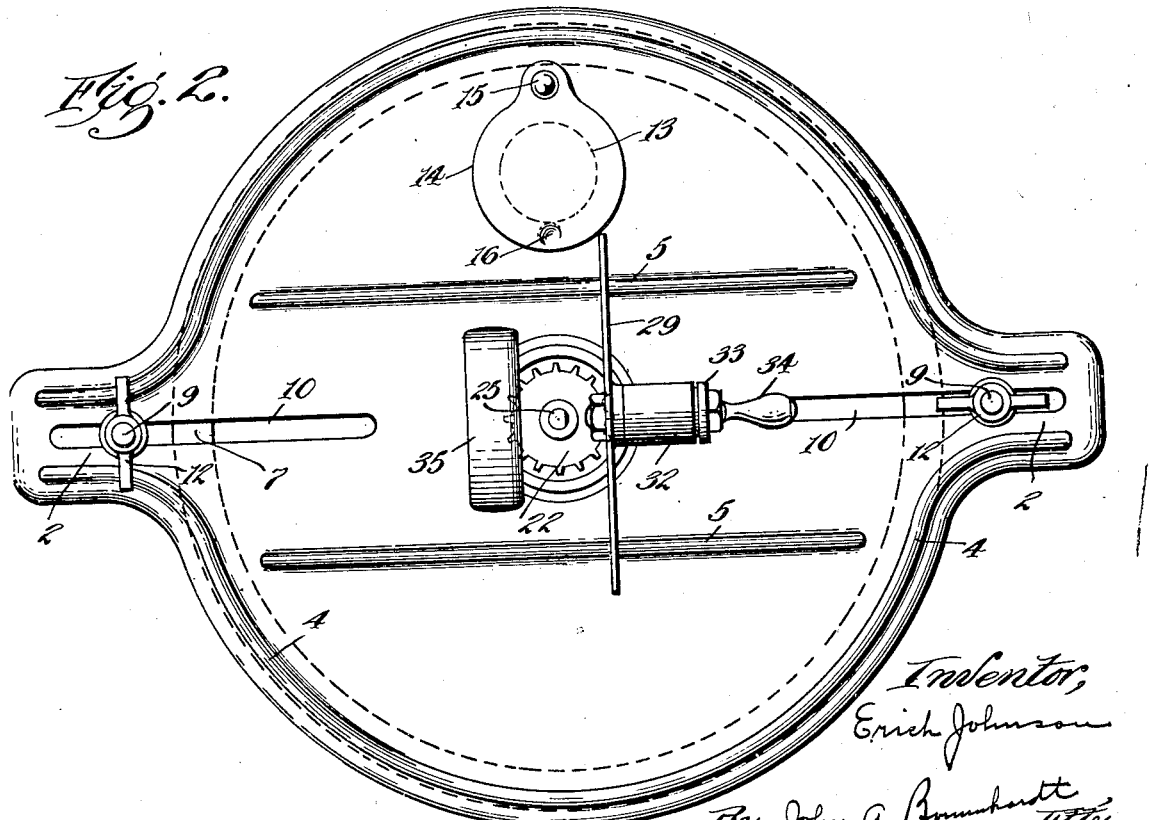

Figure 1 is a central section through the device of the character before described, and shown attached to the container; Fig. 2 is a plan view; Fig. 3 is a side elevation as viewed from the left of Fig. 1 and Fig. 4 is a detail on the line 4—4 of Fig. 1.

The device as shown comprises a metal cover 1 substantially circular in form and provided with diametrically opposed extensions 2 for a purpose to be described. For the purpose of strengthening said cover a wired edge 3 is provided and ribs 4 and 5, pressed upwardly from the cover are provided for a like purpose, the former being substantially concentric with the wired edge 3 and the latter parallel to and equi-distant from the center line thereof. The cover may be secured to a vessel or container of any shape or size, in this case shown as an ordinary china mixing bowl 6 provided at its upper edge with an annular bead 7. Means for securing the cover 1 to the vessel comprise clips having engaging lugs 8 and having secured thereto bolts 9 which pass through slots 10 formed in the cover and extending substantially from the center of the cover to the outer ends of the aforementioned extensions 2. This allows the cover to be secured to many different sized or shaped containers. The engaging lugs 8 are adapted to be placed beneath the annular bead 7 of the bowl and are locked in place by the wing nuts 12 threaded upon the bolts 9. To remove said cover it is merely necessary to loosen the wing nuts upon the bolts and slide the clips outwardly until the lugs 8 clear the underside of the bead 7, whereupon the entire device may be lifted upwardly and away from the container. An opening 13 is provided within the cover for observation purposes and may be closed by means of a rotary lid 14 pivotally secured to the cover at 15 and provided with a locking detent 16 comprising a boss punched from the lid 14, which engages a similar shaped recess in the cover 1, for the purpose of keeping said lid closed at all times.

The cover has formed at its center a semi-spherical socket 17 in which is placed a correspondingly shaped casting 18 which supports the operating structure. A bearing 19 is formed integral with the casting 18 and extends upwardly therefrom and said bearing is provided with a bore 20. A short distance from the bottom the bore is increased in diameter to support the hub 21 of a spur gear 22 and the hub of the spur gear is provided with an annular groove 23 and a set screw 24 is threaded through one side of the bearing 19 and its reduced end occupies the aforementioned groove 23, and this provides a construction whereby the sprocket wheel will be allowed to rotate within the bearing 19 but is locked against longitudinal movement thereof. The hub of the gear is provided with an internal bore through which is placed a shaft 25 locked to the gear 22 by means of a set screw 26 bearing upon the flattened side of the shaft 25 and the end of the shaft which projects within the container has secured thereto a series of whippers 27 of narrow metal strips bent in substantially circular form and placed at right angles to each other. These whippers are provided with a plurality of apertures which allows numerous air pockets to be formed in the liquid and said whippers are secured against rotation to the shaft 25 by having apertures with one flattened side which engages a flattened portion of said shaft, the bottom of the shaft being riveted over as at 28 after the whippers have been properly located thereon. The gear 22 meshes with a larger gear 29 made of a circular disk in which are punched openings 30 concentric and acting as teeth to be engaged by the teeth of the gear 22. The gear 26 is fixed to the shaft 31 supported in a bearing 32 formed integral with the beforementioned casting 18. A crank 33 provided with an operating handle 34 is secured to the other end of the shaft 31 and is provided for manual operation. For the purpose of guiding the whipper to any point within the center and for the purpose of steadying the operating parts a handle 36 cast integral with the portion 18 is provided, and the socket support permits the device to be swung around in all directions as the whippers are rotated.

While I have shown this specific form of construction in the accompanying drawings it is evident that various other forms may be employed and I do not wish to limit myself further than is required by the state of the art or that which is within the scope of the appended claims.

I claim:

1. A device of the kind described, comprising a cover adapted to be fixed upon a bowl or the like, said cover having a socket, a support having universal movement in said socket, a rotary beater having a shaft mounted in a bearing of said support, and means carried by such support to drive the shaft.

2. A device of the kind described, comprising a cover adapted to be fixed on a container, a supporting member having a ball and socket connection with said cover, whereby it may be swung to various angles, and a rotary beater carried by said supporting member and provided with means to rotate the same, said beater projecting into the container.

3. A device of the kind described comprising a cover adapted to be fixed upon a container, said cover having a semi-spherical socket therein, a ball shaped member adjustable to various angles in said socket, a rotary beater having a shaft extending through said member and into the container, and means supported by said member to rotate the shaft.

4. A device of the kind described comprising a cover adapted to be fixed upon a container, said cover having a central semi-spherical socket, a ball member fitting in said socket, and having a bearing, a rotary beater having a shaft supported in said bearing and extending through the bottom of the socket into the container, a gear on the shaft, and a crank supported by the ball member, and provided with a driving gear in mesh with said gear.

5. A device of the kind described comprising a cover adapted to be fixed upon the container, a supporting member having a ball and socket connection to the cover and provided with a handle whereby it may be swung to various angles, a rotary beater having a shaft mounted in bearings in said supporting member, and means to rotate the shaft.

6. A device of the kind described comprising a cover having a semi-spherical socket with an enlarged opening at the bottom thereof, a wall member fitting in said socket, and adjustable to various angles therein, and a rotary beater having a shaft extending through said opening into the container and mounted in a bearing in said ball member, and means supported by said member to drive the shaft.

In testimony whereof I do affix my signature in presence of two witnesses.

ERICH JOHNSON.

Witnesses:
JOHN A. BOMMHARDT,
G. W. ROSENBERG.